US008118998B2

(12) United States Patent
Bagci et al.

(10) Patent No.: US 8,118,998 B2
(45) Date of Patent: Feb. 21, 2012

(54) SELF-ADJUSTING MINIMUM LOAD FILTER CARTRIDGE AND BYPASS VALVE

(75) Inventors: Ismail C. Bagci, Cookeville, TN (US); Wilson Lee Currier, Cookeville, TN (US); James O. Stuart, Cookeville, TN (US); Donna A. Butler, Cookeville, TN (US); Sairam M. Thota, Cookeville, TN (US); Karen Ramsey-Idem, Monterey, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1033 days.

(21) Appl. No.: 11/811,987

(22) Filed: Jun. 13, 2007

(65) Prior Publication Data

US 2008/0308485 A1    Dec. 18, 2008

(51) Int. Cl.
*B01D 27/10* (2006.01)
*B01D 29/41* (2006.01)

(52) U.S. Cl. ......... 210/130; 210/295; 210/352; 210/488

(58) Field of Classification Search .......... 210/488, 210/323.2, 437–442, 316, 352, 350, 232, 210/346, 130–132, 295, 314, 317
See application file for complete search history.

(56) References Cited

U.S. PATENT DOCUMENTS

| 407,112 | A |  | 7/1889 | Parmenter et al. |
| 2,365,525 | A |  | 12/1944 | Cox |
| 2,454,033 | A |  | 11/1948 | Briggs |
| 2,575,995 | A |  | 11/1951 | Briggs et al. |
| 2,773,602 | A | * | 12/1956 | Sylvester ............... 210/117 |
| 2,874,846 | A | * | 2/1959 | Herster ............... 210/232 |
| 3,344,923 | A | * | 10/1967 | Silverwater et al. ........ 210/90 |
| 3,592,766 | A |  | 7/1971 | Kudlaty |
| 4,435,287 | A |  | 3/1984 | Sumimoto |
| 4,642,182 | A |  | 2/1987 | Drori |

(Continued)

FOREIGN PATENT DOCUMENTS

EP    362554 A1 *    4/1990

OTHER PUBLICATIONS

"A New Method for Combination Full-Flow and Bypass Filtration: Venturi Combo," by Ted S. Loftis and Mike B. Lanius; Copyright © 1997 Society of Automotive Engineers, Inc.; 7 pages.

(Continued)

*Primary Examiner* — Terry Cecil
(74) *Attorney, Agent, or Firm* — Hamre, Schumann, Mueller & Larson, P.C.

(57) ABSTRACT

A combination full flow media and bypass media filter cartridge for filtering fluid in an internal combustion engine. The apparatus includes a venturi filter having a full flow media attached to and extending between a first endplate and a second endplate. The second endplate includes an orifice. The apparatus further includes a stack of disks extending between a compression end and a venturi end. The stack of disks has a flow path defined by a plurality of openings wherein each disk includes at least one opening. The flow path extends between the compression end and the venturi end. The venturi end is substantially adjacent the second endplate of the venturi filter. The apparatus further comprises resilient compression member connected to the venturi filter for maintaining a minimum sealing force on the stack of disks.

22 Claims, 7 Drawing Sheets

U.S. PATENT DOCUMENTS

| | | |
|---|---|---|
| 5,102,541 A | 4/1992 | Breitbach |
| 5,593,577 A * | 1/1997 | Imai et al. .................... 210/232 |
| 5,665,231 A | 9/1997 | Langsdorf et al. |
| 5,695,637 A | 12/1997 | Jiang et al. |
| 6,293,410 B1 | 9/2001 | Forbes |
| 6,540,913 B1 | 4/2003 | Guichaoua et al. |
| 6,540,914 B1 | 4/2003 | Smith |
| 6,740,236 B2 * | 5/2004 | Rickle et al. .................. 210/243 |

OTHER PUBLICATIONS

"The Patented Venturi™ Combo Outperforms the Competition!" product bulletin; © Fleetguard 2004, Issue 1; printed in Australia; 3 pages.

* cited by examiner

SELF-ADJUSTING MINIMUM LOAD FILTER CARTRIDGE AND BYPASS VALVE

BACKGROUND

The present invention relates generally to combination full flow and bypass filters.

A "clean" full-flow is advantageous for maintaining easy oil throughput during normal engine operation and especially during cold starts. A restricted full-flow impedes the flow of oil during a cold start. Consequently, there is an increase in the time to get oil to critical engine components and/or an excessive time that the filter bypass valve is open. Both situations (time delays and open bypass valves) are detrimental to engine health.

Prior to the development of combination full flow and bypass filters, engines generally employed one of two forms of filtration to clean the lubricating oil. One method is full-flow filtration and the other is combined full-flow and bypass filtration. Full-flow filtering elements receive and filter 90 to 100% of the regulated oil pump output prior to supplying the oil to the engine's lubrication system. Due to the need to filter a relatively high flow rate of oil, the full-flow filter is typically designed using more porous media than bypass filters. The higher porosity allows high oil throughput while yielding a desirably low pressure drop. Thus, the full-flow provides continuous engine protection by constantly removing relatively large particles.

Full flow filters are frequently augmented with bypass filters. Bypass filters, as indicated by their name, are placed in a flow path that bypasses the engine's main oil lubrication system. Typical bypass filters receive only five to ten percent of the regulated pump output, and serve to "superclean" the oil. "Supercleaning" is accomplished by use of a relatively low porosity media. To force oil through this tight media, high pressure oil is supplied to the bypass filter inlet while the filter's outlet is essentially at zero pressure (exit flow is routed to the non-pressurized oil pan). Hence, a high pressure differential drives the flow through the bypass filter. Since the bypass flow is pumped expressly for filtration and does not directly flow to the engine's main lubrication system, it is a parasitic pumping loss. To limit the amount of the parasitic bypass flow, a restrictive orifice is generally inserted between the bypass filter and the oil pan.

Of the two filtration systems discussed, the combination system (both full-flow and bypass filtration) provides the most engine protection, yet it is likely to be more costly than a full-flow system alone. Therefore, the Venturi Combo Lube Filter (VCLF) design was intended to provide the benefits of the combination filtration system while minimizing costs and complexity. The objective was to put the total filtration system in a single container and eliminate the additional plumbing associated with bypass filters.

Both full-flow filter media (FFM) and bypass type filter media (BPM) are preferably in a single container. A key feature of the Venturi Combo Lube Filter design is the increased utilization of the high capacity, high efficiency bypass type filter media. Specifically, the intent is to capture the bulk of the contaminant in the bypass type filter media while allowing the full-flow filter media to remain relatively clean. Thus, the full-flow filter media can provide continuous low-pressure-drop filtration.

The operation of the Venturi Combo Lube Filter is as follows; similar to the combination lube filter, the full-flow filter media and bypass type filter media share a common inlet. However, the Venturi Combo Lube Filter employs a venturi nozzle (see, for example, U.S. Pat. No. 5,695,637 to Jiang et al.) to direct and force/pull oil through the bypass type filter media at a high flow rate. The higher flow rate is accomplished via these flow mechanisms; the flow through the freer-flowing full-flow element is restricted by the nozzle throat at nozzle inlet, forcing more flow through the bypass type media. A low pressure zone in the throat of the nozzle generates a suction at the outlet of the bypass media, pulling more flow through the tight bypass section.

The bypass type filter media and full-flow filter media flows then merge inside the filter, thereby sending 100% of the filtered flow to the engine's lubrication system. The system is made energy efficient by the use of a nozzle diffuser which reduces the fluid's velocity to recover a portion of the pressure drop lost in the nozzle throat (ref. Bernoulli's equation).

Note the Venturi Combo Lube Filter preferably has only one outlet versus two in the combination lube filter. The single outlet simplifies engine plumbing. Also, elimination of the companion engine bypass flow circuit eliminates parasitic bypass flow. Having one filter inlet and outlet means existing applications which use full-flow-only filter can easily apply the Venturi Combo Lube Filter with no equipment/engine modifications.

It is an object of this invention to provide an improved combination full flow media and bypass media cartridge.

SUMMARY

In a first embodiment of the present invention there is a combination full flow media and bypass media filter cartridge for filtering fluid in an internal combustion engine. The apparatus includes a venturi filter having a full flow media attached to and extending between a first endplate and a second endplate. The second endplate includes an orifice. The apparatus further includes a stack of disks extending between a compression end and a venturi end. The stack of disks has a flow path defined by a plurality of openings wherein each disk includes at least one opening. The flow path extends between the compression end and the venturi end. The venturi end is substantially adjacent the second endplate of the venturi filter. The apparatus further comprises means connected to the venturi filter for maintaining a minimum sealing force on the compression end of the stack of disks.

In one refinement of the embodiment the means for maintaining comprises a first flange, a second flange, and a longitudinal member. The first flange is adjacent to the compression end of the stack of disks. The second flange is spaced apart from the first flange by a spring. The longitudinal member is attached to the second flange and connected to the venturi filter. The longitudinal member passes through a centrally located portal in the first flange and further extends through the openings in the stack of disks and through the orifice of the venturi filter.

In a further refinement the longitudinal member is connected to the venturi filter by at least two ratcheted lugs. At least a portion of the lugs are positioned within the stack of disks and define a flow channel fluidly connected to an at least partially open internal volume within the venturi filter through the orifice in the second endplate.

In another refinement the means for maintaining comprises a longitudinal member and a spring. The spring is adjacent to the compression end of the stack of disks. The spring is integrally attached to an at least partially hollow longitudinal member. The longitudinal member extends through the openings in the stack of disks to the venturi filter. The longitudinal member has an open end fluidly connected to an at least partially open internal volume within the venturi filter through the orifice in the second endplate. The longitudinal member is connected to the venturi filter by ratchets.

In a further refinement the longitudinal member is connected to the venturi filter by at least two lugs with ratchets thereon. At least a portion of the lugs positioned within the stack of disks define a channel fluidly connected to the open end.

In a further refinement the spring has a plurality of radial appendages. Each appendage has a radially outer end bent downward toward the compression end of the stack of disks. The radially outer ends of the appendages being connected by a circumferential ring.

In a further refinement the full flow media is a substantially annular pleated cellulose media.

In another refinement the means for maintaining comprises a compression member and a longitudinal member. The compression member is adjacent to the compression end of the stack of disks. The compression member has an aperture therein. The second endplate has attached thereto an at least partially hollow longitudinal member extending away from the second endplate and through the openings in the stacked disks and through the aperture of the compression member. The longitudinal member has an external surface defining at least one ratchet to connect the venturi filter to the compression member.

In a further refinement the compression member has a plurality of radial appendages. Each appendage has a radially outer end bent downward toward the compression end of the stack of disks. The radially outer ends of the appendages being connected by a circumferential ring.

In another refinement the means for maintaining comprises a compression endplate and a longitudinal member. The compression endplate is substantially adjacent to the compression end of the stack of disks. The compression endplate is integrally attached to an at least partially hollow longitudinal member extending through the openings in the stack of disks to the venturi filter. The longitudinal member has a far end fluidly connected to an at least partially open internal volume within the venturi filter through the orifice in the second endplate of the venturi filter. The longitudinal member is connected to the venturi filter by at least one of a plurality of ratchets on the far end of the longitudinal member.

In a further refinement the compression endplate includes a centrally located hole that is fluidly connected to the internal volume of the venturi filter via the substantially hollow longitudinal member.

In a further refinement the compression endplate comprises a plurality of radially extending flanges, each flange having a radially outer end being flexed toward or away from the compression end of the stack of disks.

In a further refinement the plurality of ratchets are formed on at least two lugs. At least a portion of the lugs positioned within the stack of disks define a channel fluidly connected to the internal volume within the venturi filter.

In another refinement the filter cartridge further comprises an integrated bypass valve.

In a further refinement the bypass valve is preferably positioned between the venturi end of the stack of disks and the second end of the venturi filter.

In another embodiment of the present invention there is a filter cartridge for filtering fluid in an internal combustion engine. The filter cartridge comprises a full flow filter media attached to and extending between a head end endplate and a dome end endplate, the dome end endplate including an orifice. The filter cartridge further comprises a bypass filter media comprising a plurality of stacked disks extending between a bottom end and a top end. The bottom end is substantially adjacent to the dome end endplate. Each disk includes an aperture. The apertures in adjacent disks overlap one another to define a channel extending between the bottom end and the top end. The filter cartridge further comprises a compression member substantially adjacent to the top end of the bypass media. The filter cartridge further comprises a longitudinal member extending through the channel between a first end and a second end. One of the first end and the second end of the longitudinal member is substantially adjacent to the dome end endplate of the full flow filter media. The other of the first end and the second end is substantially adjacent to the top end of the bypass media. One of the first end and the second end is joined to the dome end endplate or compression member. The other of the first end and the second end is connected to the other of the dome end endplate or compression member via a plurality of ratchets at the other of the first end and the second end.

In one refinement the full flow filter media is a substantially annular pleated cellulose media.

In another refinement the first end of the longitudinal member is attached to the compression member and the second end of the longitudinal member is connected to the orifice of the dome end endplate.

In another refinement the compression member comprises a plurality of radially extending flanges. Each flange has a radially outer end being flexed toward or away from the top end of the plurality of stacked disks.

In another refinement the second end of the longitudinal member includes a first lug and a second lug, the lugs including ratchets thereon.

In another refinement the filter cartridge further comprises a bypass valve sandwiched between the full flow filter media and the bypass flow filter media.

In another embodiment of the present invention there is a combination full flow media and bypass media filter cartridge for filtering fluid in an internal combustion engine. The filter cartridge comprises a venturi filter, a bypass filter in the form of a stack of disks, and a bypass valve. The venturi filter has a substantially annular pleated media attached to and extending between a head end endplate and a dome end endplate. The dome end endplate includes an orifice. The stack of disks extends between a compression end and a venturi end. The stack of disks has an internal columnar flow path defined by a plurality of centrally positioned openings. Each disk includes at least one opening. The flow path extends between the compression end and the venturi end. The venturi end of the stack of disks is substantially adjacent the dome end endplate of the venturi filter. The bypass valve is preferably sandwiched between the venturi end of the stack of disks and the dome end endplate of the venturi filter.

In one refinement the bypass valve, instead of being sandwiched between the venturi filter and bypass filter, might instead be adjacent the bypass filter at an end furthest from the venturi filter.

DESCRIPTION OF THE ILLUSTRATIVE EMBODIMENTS

Figure 1:
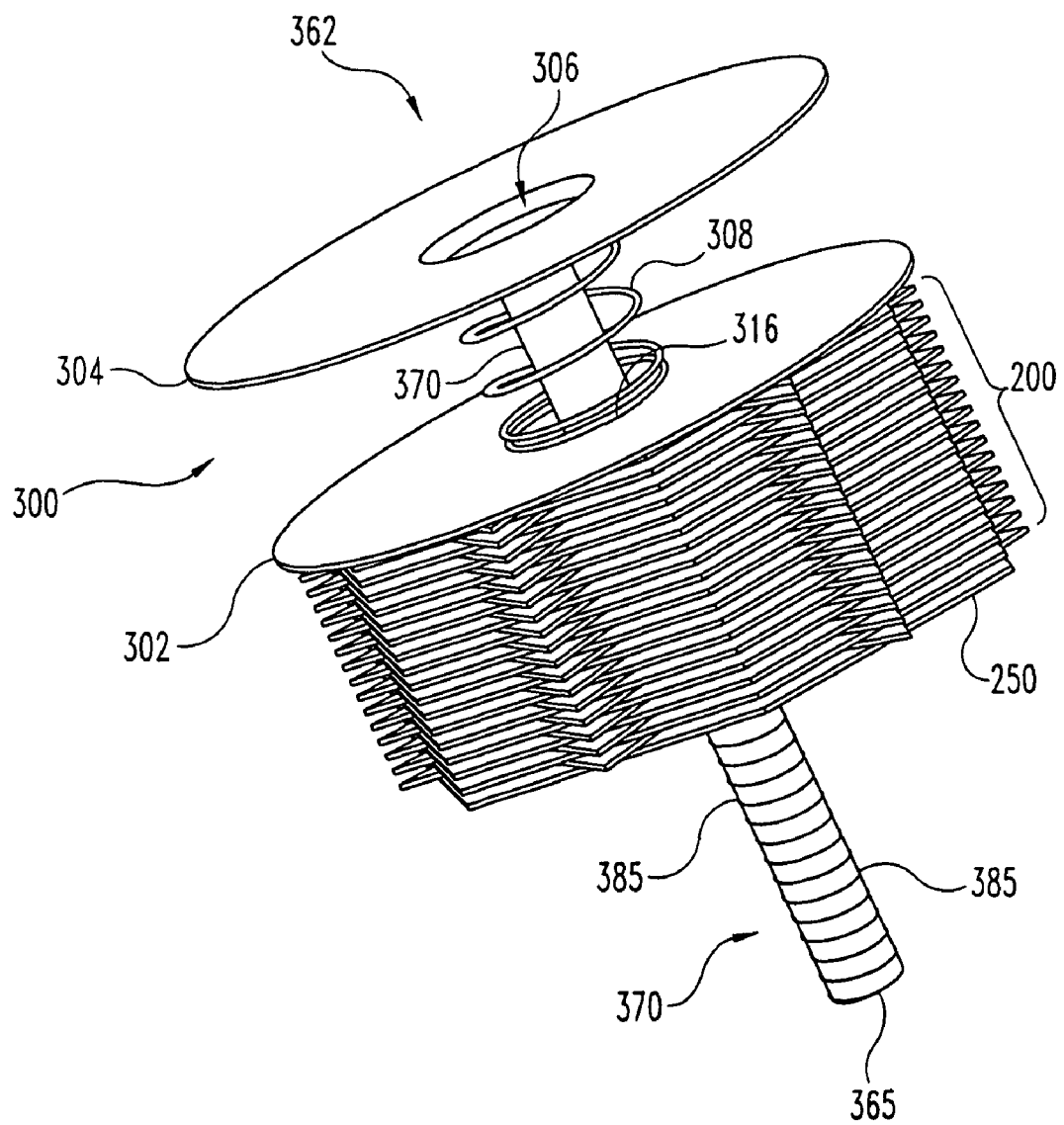
FIG. 1 is a side perspective view of one embodiment of an apparatus for maintaining a minimum load on the stacked disks.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates generally to combination full flow and bypass filters. In one example, various embodiments of the present invention will preferably complement the venturi combo filter as disclosed in U.S. Pat. No. 6,540,913 to Guichaoua et al. titled "Filter apparatus having a maintaining device for centering a stack of filtration disks". One aim of U.S. Pat. No. 6,540,913 was a method to attach stacked disks to an embedded venturi cartridge filter. The stacked disks enhance filter performance. For example, stacked disks in some applications will improve the areas of service interval and sludge control.

One embodiment of U.S. Pat. No. 6,540,913 relates to an apparatus for maintaining a stack of filtering disks. The disks are positioned between two flanges, one of which is mobile. A central element crosses through the hole of the stack and at its end presents a plurality of superposed ratchets that lock into an opening in the other flange. As discussed in U.S. Pat. No. 6,540,913, a problem encountered with this type of filter medium comes from the fact that the height of the stack diminishes little by little with time. In fact, in order to avoid a radial passage of the fluid to be filtered in such a stack, which would lower the quality of filtration, it is necessary to compress said stack in such a way as to ensure permanent and good cohesion of the disks constituting it. As further discussed in U.S. Pat. No. 6,540,913, during operation the height of the disk stack reduces little by little. Under the effect of the pressure of the filter liquid, the assembly constituted by the mobile flange and the central element penetrates the other flange. The ratchets on the central element assist in preventing separation of the flanges.

Lab testing that simulates normal engine operating environment regarding temperature and pressure, has confirmed that the stacked disks will shrink approximately 12.7 mm (0.50 inches) in height. Current filter designs will not always maintain the required minimum load on the stacked disks to maintain a minimum sealing force to prevent or minimize particulate bypass for the entire planned life of the filter.

Some embodiments of the present invention (FIGS. 1-6 discussed below) include features to compensate for the fact that the stacked disks material will shrink during a normal service interval. Various embodiments addressing shrinkage will preferably maintain a minimum load of 25 $lb_f$ on the stacked disks. A minimum load will ensure the stacked disks seal properly, and minimize the likelihood of inadvertent bypass of the stacked disks material by fluid to be filtered.

Figure 2:
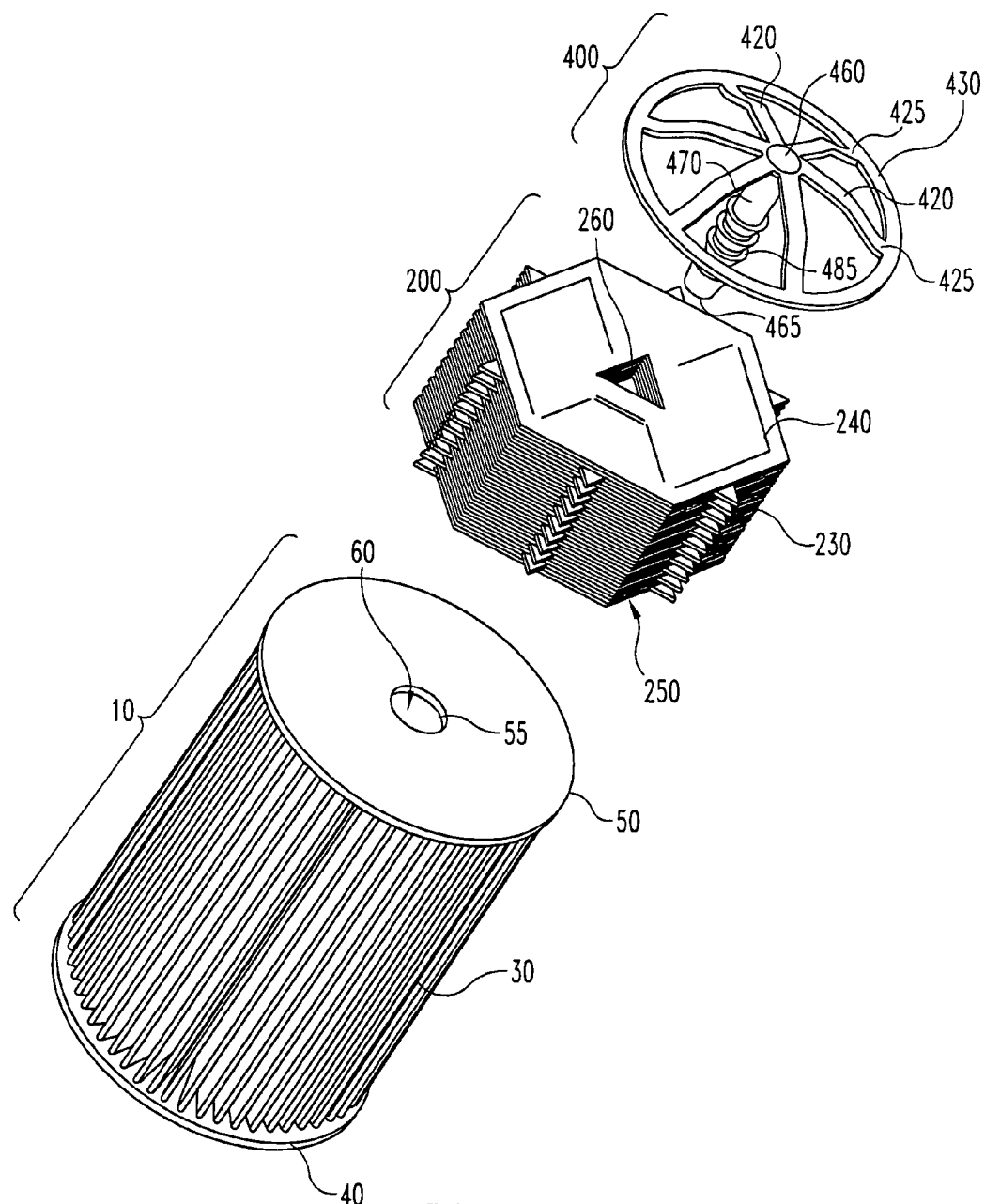
FIG. 2 is an exploded top perspective view of another embodiment of an apparatus for maintaining a minimum load in combination with the stacked disk bypass filter media and full flow filter media.

Various embodiments of the present invention relate to combination full flow media and bypass media filter cartridge. Combination filter cartridges find applications in, for example, filtering fluid in an internal combustion engine. As illustrated in FIG. 2, one embodiment of the venturi filter 10 includes the full flow filter media 30 extending between a head end endplate 40 and dome end endplate 50. The full flow filter media 30 is preferably embedded into the endplates 40, 50. It is contemplated as within the scope of the invention, however, that full flow filter media 30 may be attached to endplates 40, 50 by a variety of methods known to those skilled in the art including various adhesives, as opposed to being embedded. Full flow filter media 30 preferably extends between, and is joined to, the endplates 40, 50. The full flow filter media 30 is preferably a substantially annular pleated cellulose media. Full flow filter media 30 defines an at least partially open internal volume 60 when it is a substantially annular shape (see FIG. 4).

Again with reference to FIG. 2 there is illustrated a bypass media portion 200 of the filter cartridge. Bypass media portion 200 comprises a plurality of stacked disks 230 extending between a venturi end 250 and a compression end 240. Each disk in the plurality of stacked disks 230 includes an opening 260. The opening 260 of the venturi end 250 of the plurality of stacked disks 230 is preferably aligned with an orifice 55 defined by dome end endplate 50 of venturi filter 10. When the filter cartridge is assembled the venturi end 250 is preferably substantially adjacent the dome end endplate 50 of venturi filter 10.

The focus of the description of the next several paragraphs relates to various embodiments that disclose means connected to the venturi filter 10, 110 for maintaining a minimum sealing force on the stack of disks. As a result, details concerning the venturi filter 10 and bypass media portion 200 of the filter cartridge will be common to many of these embodiments. Thus, rather than repeating details discussed above, like identical reference numerals will be used. These reference numerals are intended to refer to the same components previously discussed.

With reference to FIG. 1 there is illustrated a first embodiment of a means connected to the venturi filter for maintaining a minimum sealing force on the stacked disks 230. The means for maintaining minimum sealing force 300 includes a first flange 302 and a second flange 304 spaced apart from the first flange by a helical spring 308. First flange 302 includes a first portal 316. Similarly, second flange 304 preferably includes a second portal 306. Means for maintaining a minimum sealing force 300 also includes a longitudinal member 370. Longitudinal member 370 is preferably integrally attached to the second flange 304 and might include an open end 362 that is fluidly connected to the second portal 306 of the second flange 304. The longitudinal member 370 extends through the preferably centrally located portal 316 of first flange 302 and further extends through the openings 260 in stack of disks 230. The other open end 365 of longitudinal member 370 preferably passes through the orifice 55 of dome end endplate 50 of the venturi filter 10 (see FIG. 2). The external surface of longitudinal member 370 at and adjacent to end 365 preferably includes a plurality of ratchets 385. The ratchets 385 connect the second flange 304 to the venturi filter.

First flange 302 and second flange 304 preferably include a diameter slightly greater than the exterior diameter of the stack of disks 230 to prevent unfiltered flow from reaching open end 362 and portal 306. Alternatively, the portal 306 might be omitted. It should be understood, however, that it is contemplated as within the scope of the invention that first flange 302 and second flange 304 may have a smaller diameter so that unfiltered fluid flow bypasses the stack of disks 230 may flow through the open end 362 of a longitudinal member 370 in embodiments that include a bypass valve assembly, such as described below with reference to FIG. 7. After passing through the open end 362 and the longitudinal member 370, the unfiltered fluid may pass through the preferably substantially hollow interior of longitudinal member 370. Similarly, filtered flow may enter the substantially hollow interior of longitudinal member 370 through flow windows or channels (not illustrated) in the portion of the longitudinal member 370 that is positioned within the openings 260 of stack of disks 230. The unfiltered flow through the bypass valve, or filtered flow through windows or channels, exits the open second end 365 of longitudinal member into the at least partially open internal volume 60 of venturi filter 10.

Referring now to FIG. 2 there is illustrated another embodiment of a means connected to the venturi filter for maintaining a minimum sealing force on the compression end 240 of the stack of disks 230. The means for maintaining 400 comprises a spring and ratchet assembly. The assembly 400 includes a plurality of radial appendages 420 terminating at radial outer ends 425. The radial outer ends 425 are attached to one another by a circumferential ring 430. The compression member portion is attached to a longitudinal member 470. The longitudinal member 470 is preferably substantially hollow and defines a flow path connecting an opening 460 that is preferably centrally located to an open far end 465. The exterior surface of the longitudinal member 470 at or adjacent end 465 preferably defines the plurality of ratchets 485. When assembled, the end 465 of the longitudinal member is passed through the openings 260 in the stack of disks 230. The end 465 then passes through the orifice 55 of dome end endplate 50 of the venturi filter 10. The ratchets 485 connect the assembly 400 to the venturi filter 10. The bottom surface of the circumferential ring 430 of the compression member presses against the compression end 240 which in turn transmits a sealing force to the bottom surface at venturi end 250.

Figure 3:
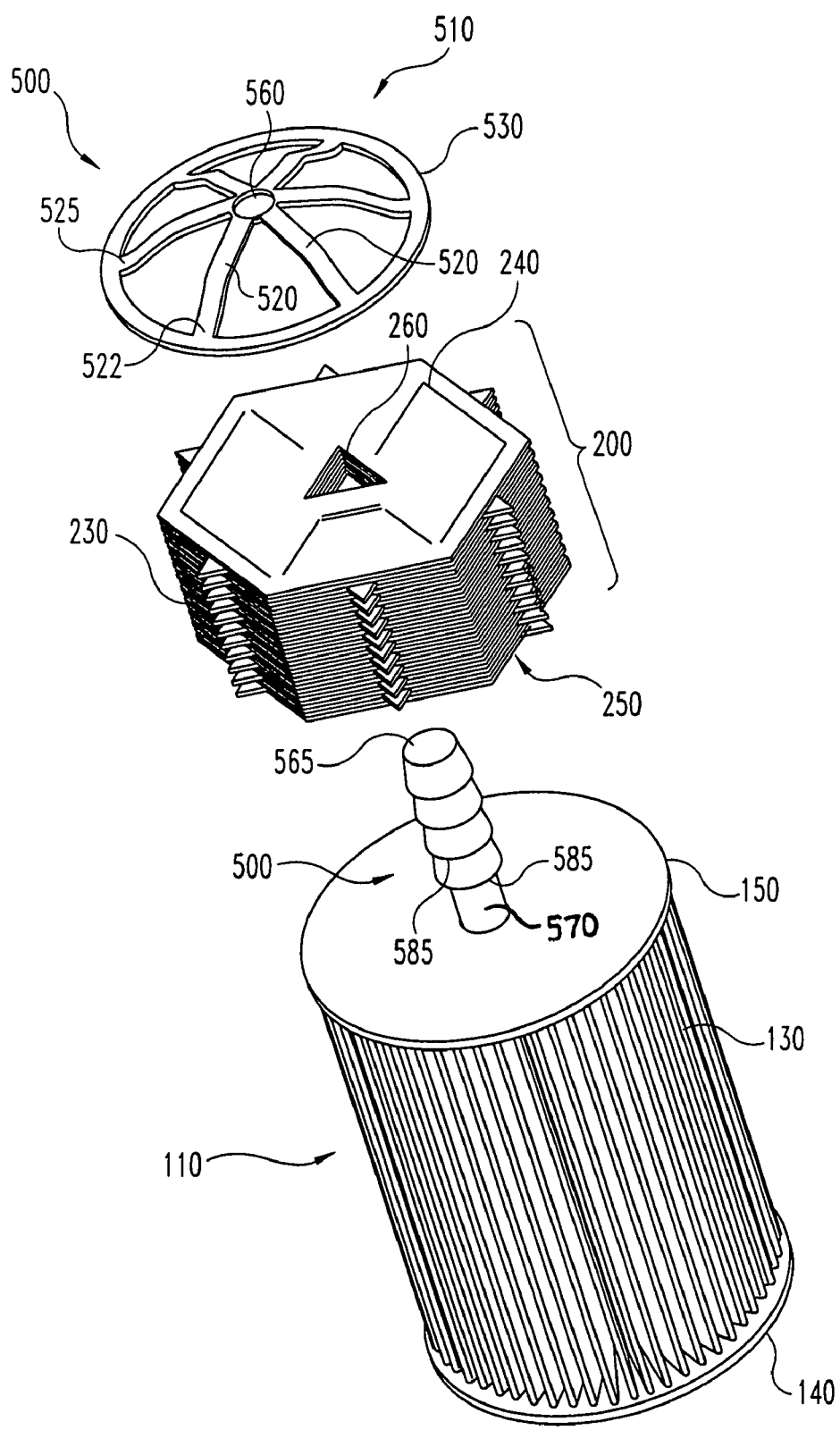
FIG. 3 is an exploded top perspective view of another embodiment of an apparatus for maintaining a minimum load in combination with the stacked disk bypass filter media and full flow filter media.

Referring now to FIG. 3 there is illustrated another embodiment of a means 500 attached to the venturi filter 110 for maintaining a sealing force on the compression end 240 of the stack of disks 230. The venturi filter 110 includes a full flow filter media 130 (preferably a substantially annular pleated cellulose media). The full flow filter media 130 extends between and is attached to a head end endplate 140 and a dome end endplate 150. In the embodiment of FIG. 3 the longitudinal member 570 is preferably integrally attached to the dome end endplate 150. Once again the longitudinal member 570 is preferably substantially hollow and exhausts into the at least partially open internal volume (not illustrated in FIG. 3) through an orifice (not illustrated in FIG. 3) in dome end endplate 150 that is fluidly connected to an open end 565. Longitudinal member 570 defines a plurality of ratchets 585 at and/or near the end 565. The end 565 of longitudinal member 570 passes through the plurality of openings 260 defined within the stack of disks 230 of bypass media portion 200 of the filter cartridge. Open end 565 then passes through an opening 560 in the compression member 510. One or more of the ratchets 585 also pass through the opening 560 and compression member is thus connected to the venturi filter 110 and exerts a minimum force on the compression end 240 of the stack of disks 230 that is transmitted to the venturi end 350. Compression member 510 includes a plurality of radial appendages 520 having radial outer tips 525. The radial outer tips 525 of radial appendages 520 are attached to one another by a circumferential ring 530.

Figure 4:
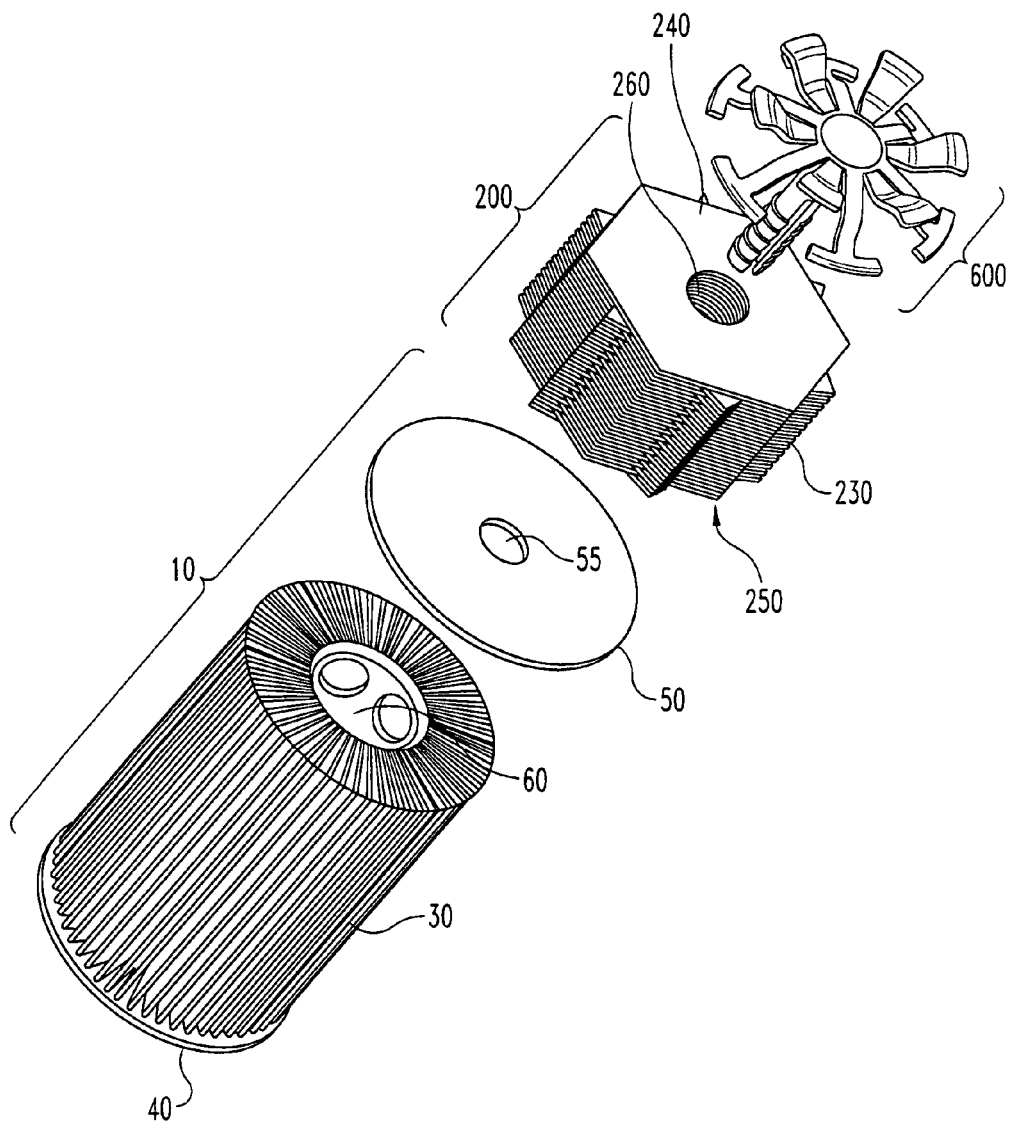
FIG. 4 is an exploded top perspective view of another embodiment of an apparatus for maintaining a minimum load in combination with the stacked disk bypass filter media and full flow filter media.
Figure 5:
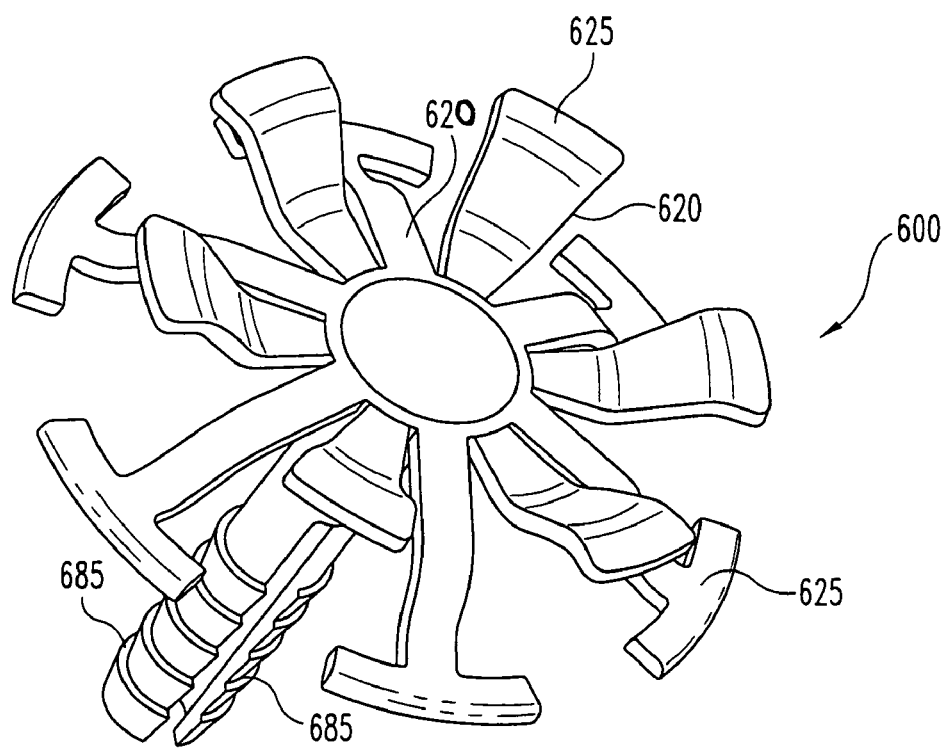
FIG. 5 is an enlarged top perspective view of a portion of the apparatus of FIG. 4 for maintaining a minimum load.
Figure 6:
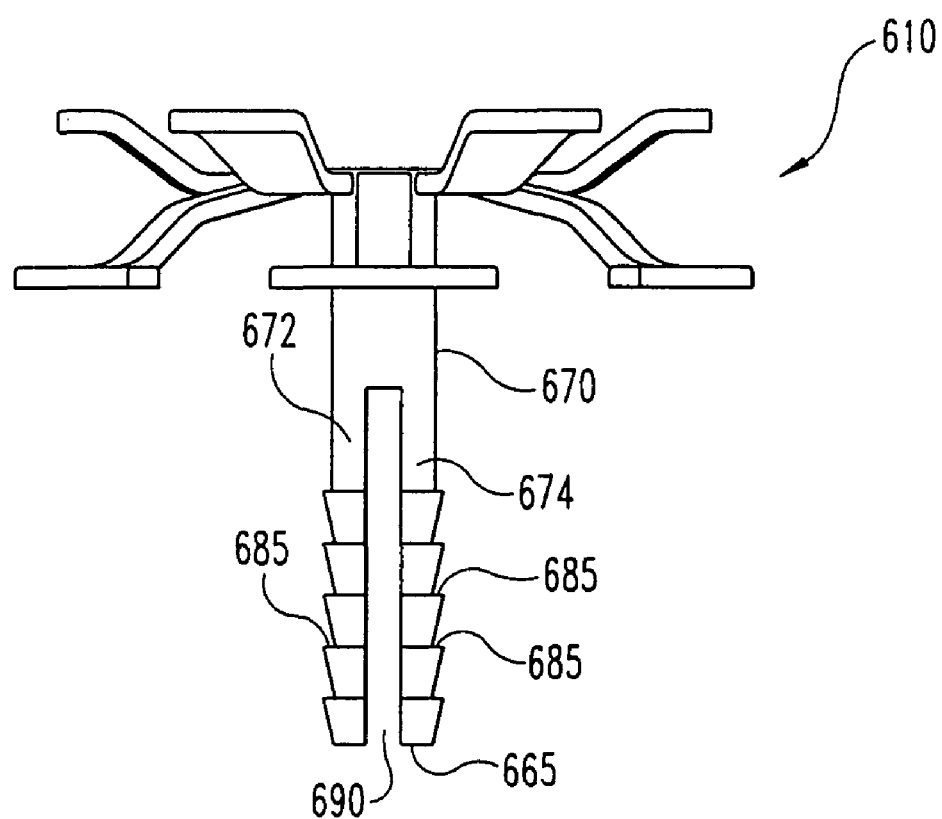
FIG. 6 is a rotated side view of the apparatus of FIG. 5.

With references to FIGS. 4-6 there is illustrated another embodiment of a means 600 connected to the venturi filter 10 for maintaining a minimum sealing force on the compression end 240 of the stack of disks 230. The means 600 includes a compression endplate 610 attached to a longitudinal member 670. The compression endplate 610 preferably includes a plurality of radially extending flanges 620, the radially outer ends 625 of which are flexed toward or away from the compression end 240 of the stack of disks 230. The radially outer ends 625 of the radial flanges 620 of compression endplate 610 are preferably flexed in axially opposing directions in alternating fashion around the circumference of the compression endplate 610. A longitudinal member 670 is preferably integrally formed with the compression endplate 610 but may be attached or joined in a variety of methods known to those of ordinary skill in the art. The longitudinal member is at least partially hollow.

In one embodiment (not illustrated) there is an opening in the center of the compression endplate 610 similar to the openings 460 and 560 in prior embodiments. However, in the illustrated embodiment of FIGS. 4-6, the longitudinal member 670 is divided into first lug 672 and second lug 674. Lugs 672, 674 define a plurality of ratchets 685 thereon. The longitudinal member 670 is at least partially hollow and defines a flow channel 690 between the lugs 672, 674 that extends to end 665 of longitudinal member 670. The end 665 passes through the openings 260 and the stack of disks 230 and further passes through the orifice 55 of dome end endplate 50 of venturi filter 10. Thus, fluid filtered by passing radially through the stack of disks 230 is able to flow through channel 690 and further through the orifice 55 into the at least partially open internal volume 60 defined by the preferably substantially annular pleated cellulose filter media 30 of venturi filter 10.

In another embodiment of the present invention there is a bypass valve that is preferably an integral part of a combination venturi full flow and bypass stacked disks filter cartridge. Such a combination filter cartridge might include embodiments previously disclosed above, as well as other existing designs for a Venturi Combo filter assembly that include, but are not limited to, that disclosed in U.S. Pat. No. 6,540,913 to Guichaoua et al. The integrated bypass valve might also find use in applications other than filter cartridges, such as spin on combination full flow and bypass media filter products.

Typical lube filter bypass valve opening pressures (located in the filter head) are set at 50 to 80 psi. Cummins and some other original equipment engine manufacturers sell engines in which the bypass valve opening pressure is set as high as 100-120 psi. This high opening pressure has caused issues with stacked disks bypass filters. The stacked disks in some extreme cases have broken up and migrated down stream of the filter. These same engine manufactures have also sometimes undersized the bypass valve area so even if the valve is fully open it might be unable to handle the total flow rate, and creates extremely high restrictions across the filter.

Figure 7:
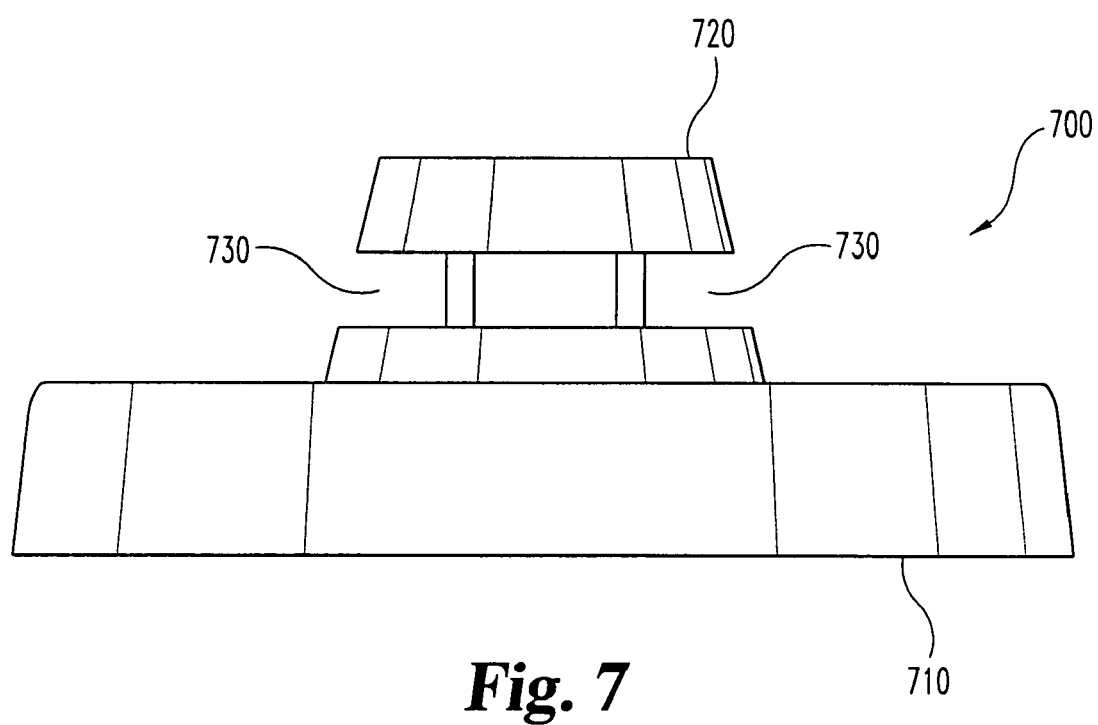
FIG. 7 is an embodiment of a bypass valve intended to be an integrated part of a combination full flow media and bypass media filter cartridge.

In one refinement of the embodiment the bypass valve is preferably located between the stack of disks of the bypass media portion of the filter cartridge and the full flow inner element of the venturi filter portion of the filter cartridge. Referring to FIG. 7, there is illustrated one example of a bypass assembly 700 preferably integrated between, for example, the venturi filter 10, 110 and bypass media portion

200. The bypass assembly 700 extends axially between a venturi filter end 710 and a stacked disks end 720. The bypass assembly 700 includes a plurality of windows 730 through which unfiltered fluid can flow to reach the valve within.

It should be understood that it is contemplated as within the scope of the invention that the bypass assembly 700, or a similar bypass assembly, might instead be integrated within the combination full flow and bypass media filter cartridge at a different location. For example, referring again to FIG. 1, the bypass assembly might be adjacent to second flange 304. The stacked disk end 720 would preferably be aligned with the portal 362 of second flange 304. The bypass valve would prevent flow from entering portal 362 except at operating pressures above a certain point.

The bypass valve will open at a predetermined pressure and allow flow to totally bypass the combination full flow and bypass filter. This will allow unfiltered oil to flow past the combination filter and on to the engine, and will keep oil flowing to key engine components and will eliminate engine issues. The integrated bypass assembly will also prevent high velocity oil from flowing through the stacked disk when the full flow inner element plugs with contaminant. This prevents the initiation of the media migration issue (i.e. migration of broken stacked disks). The use of the bypass assembly and valve thus provides improved flow characteristics at high differential pressure, such as during cold start or other high loading conditions. This lowers the risk of high differential pressure across stacked disk packs, and eliminates a failure mode of stacked disks.

It should be understood that not all details of the inner components of venturi filters 10, 110 are explicitly described and/or illustrated above. Those of ordinary skill in the art will understand that the venturi filters will have a head end endplate with an exit orifice as well as inner components such as a nozzle. One example of design features relating to the same may be found in U.S. Pat. No. 5,695,637 to Jiang et al., the contents of which are incorporated herein by reference.

Various embodiments herein describe a longitudinal member with at least one ratchet thereon. The ratchets connect the longitudinal member to one of the compression assembly and the venturi filter, the longitudinal member preferably being integrally formed with the other of the compression assembly and the venturi filter. It should be understood that it is preferable that the longitudinal member include a plurality of ratchets thereon. Furthermore, it should be understood that it is contemplated as within the scope of the invention that all embodiments herein that describe an external surface with at least one ratchet might instead be a longitudinal member with a plurality of ratcheted lugs, and vice-versa.

The longitudinal member described herein with respect to various embodiments is preferably integrally formed with one of the compression assembly and the embedded venturi filter (the longitudinal member preferably being mechanically connected by ratchets to the other of the compression member and the embedded venturi filter). However, it should be understood that it is contemplated as within the scope of the invention that, instead of being integrally formed, the longitudinal member may be attached/joined in a variety of methods known to those of skill in the art. Such methods include, but are not limited to, (depending on material composition of the components) welding, brazing, soldering, melt bonding, gluing or adhering via cement or other adhesives.

Similarly, it should be understood that the bypass filter medium preferably comprises a stack of paper or cardboard disks each having a central aperture (able to be of circular, oval, oblong, hexagonal, octagonal or other shape). The term "disk stack" or "stack of disks" 200 as used in the present patent application is aimed at covering any laminate structure constituted by superposition of several layers of filter medium in paper, cardboard or any other equivalent material, for example synthetic or inorganic fibers, able to take any geometric shape. The disks constituting the stack in question preferably include one or several holes. The holes in the disks may be either aligned or staggered, but in either case the holes preferably assume a columnar form, providing an interior filtered lubricant channel. The column is preferably centrally located, thus showing a central aperture at either end. However, it should be understood that locations other than central are contemplated as within the scope of the invention, and thus the longitudinal member described for various embodiments of the present invention may also be other then centrally located.

Various embodiments disclosed herein illustrate fluid flow through openings at the end of the longitudinal member, or through channels defined by, for example, lugs at one end of the longitudinal member. It should be understood that a large number of variations on fluid entry into the longitudinal member and through to the venturi filter are contemplated as within the scope of the invention. The disclosed embodiments explicitly refer to an open channel defined by separate lugs at the venturi end (or an opening in the compression member fluidly connected to a hollow interior). However, the longitudinal member might instead include a number of perforations that permit fluid filtered by radially passing through the stack of disks to flow into a partially hollow longitudinal member and on through an open end and into an at least partially open volume within the venturi filter through the orifice in the dome end endplate.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A combination full flow media and bypass media filter cartridge for filtering fluid in an internal combustion engine, comprising:

a venturi filter having a full flow media attached to and extending between a first endplate and a second endplate, the second endplate including an orifice;

a stack of disks extending between a compression end and a venturi end, the stack of disks having a flow path defined by a plurality of openings wherein each disk includes at least one opening, the flow path extending between the compression end and the venturi end, the venturi end being substantially adjacent the second endplate of the venturi filter; and a compression mechanism connected to the venturi filter and applying a resilient biasing force on the stack of disks to bias the disks towards the venturi filter to maintain a minimum sealing force on the stack of disks,
wherein the compression mechanism includes a longitudinal member and a resilient biasing member, the longitudinal member has a first end and a second end opposite to the first end and defines a fluid flow passageway, the fluid flow passageway is fluidly connected to the flow path of the disks, the resilient biasing member is connected to the longitudinal member at the first end, and the second endplate of the venturi filter is connected to the longitudinal member substantially adjacent the second end; and
wherein the resilient biasing member extends from a first end portion to a second end portion, the first end portion is connected to the first end of the longitudinal member, and the second end portion abuts against the compression end of the disks.

2. The filter cartridge of claim 1, wherein the second end portion of the resilient biasing member comprises a first flange adjacent to and engaged with the compression end of the stack of disks;
the first end portion of the resilient biasing member comprises a second flange fixed to the first end of the longitudinal member;
the resilient biasing member further comprises a spring surrounding the longitudinal member and having a first end engaged with the first flange and a second end engaged with the second flange; and
wherein the longitudinal member passes through a portal opening in the first flange and further extends through the openings in the stack of disks and through the orifice of the second endplate.

3. The filter cartridge of claim 2, wherein the longitudinal member is connected to the venturi filter by at least two ratcheted lugs, and wherein at least a portion of the lugs is positioned within the stack of disks, and the fluid flow passageway is fluidly connected to an at least partially open internal volume within the venturi filter.

4. The filter cartridge of claim 1, wherein the resilient biasing member is integrally attached to the longitudinal member.

5. The filter cartridge of claim 4, wherein the longitudinal member is connected to the venturi filter by at least two lugs with ratchets thereon, and wherein at least a portion of the lugs is positioned within the stack of disks.

6. The filter cartridge of claim 5, wherein the resilient biasing member has a plurality of radial appendages extending between the first end portion and the second end portion of the resilient biasing member, each appendage has a radially outer end bent downward toward the compression end of the stack of disks, and the second end portion has a circumferential ring connecting the radially outer ends of the appendages.

7. The filter cartridge of claim 5, wherein the full flow media is a substantially annular pleated cellulose media.

8. The filter cartridge of claim 1, wherein the longitudinal member is attached to and extends away from the second endplate, the longitudinal member extends through the openings in the stacked disks, the longitudinal member having an external surface defining at least one ratchet that connects the venturi filter to the resilient biasing member.

9. The filter cartridge of claim 8, wherein the resilient biasing member has a plurality of radial appendages extending between the first end portion and the second end portion of the resilient biasing member, each appendage has a radially outer end bent downward toward the compression end of the stack of disks, and the second end portion has a circumferential ring connecting the radially outer ends of the appendages.

10. The filter cartridge of claim 1, wherein the fluid flow passageway extends from the first end of the longitudinal member to the second end of the longitudinal member, the second end of the longitudinal member is connected to the venturi filter by a plurality of ratchets.

11. The filter cartridge of claim 10, wherein the resilient biasing member comprises a plurality of radially extending flanges extending from the first end portion to the second end portion of the resilient biasing member, the second end portion comprises a plurality of radially out ends each connected to one of the radially extending flanges, the radially outer ends are flexed toward the compression end of the stack of disks.

12. The filter cartridge of claim 11, wherein the plurality of ratchets are formed on at least two lugs, and wherein at least a portion of the lugs is positioned within the stack of disks.

13. The filter cartridge of claim 1, wherein the longitudinal member includes a portal opening at the first end that is fluidly connected to the fluid flow passageway of the longitudinal member to allow fluid that bypasses the disks to flow into an at least partially open internal volume within the venturi filter.

14. The filter cartridge of claim 1, further comprising an integrated bypass valve.

15. A filter cartridge for filtering fluid in an internal combustion engine, comprising:
a full flow filter media attached to and extending between a head end endplate and a dome end endplate, the dome end endplate including an orifice;
a bypass filter media comprising a plurality of stacked disks extending between a bottom end and a top end, the bottom end being substantially adjacent to the dome end endplate, wherein each disk includes an aperture, the apertures in adjacent disks overlapping one another to define a fluid flow channel extending between the bottom end and the top end;
a compression member substantially adjacent to the top end of the bypass media, the compression member applying a resilient biasing force on the bypass filter media to bias the bypass filter media towards the full flow filter media; and
a longitudinal member extending through the fluid flow channel between a first end and a second end, one of the first end and the second end of the longitudinal member being substantially adjacent to the dome end endplate of the full flow filter media, the other of the first end and the second end being substantially adjacent to the top end of the bypass media, wherein one of the first end and the second end is joined to the dome end endplate or compression member, and the other of the first end and the second end is connected to the other of the dome end endplate or the compression member via a plurality of ratchets at the other of the first end and the second end,
wherein the longitudinal member defines a fluid flow passageway fluidly connected to the fluid flow channel of the disks, and
wherein the compression member extends from a first end portion to a second end portion, the first end portion is connected to one of the ends of the longitudinal member substantially adjacent the top end of the bypass filter, and the second end portion abuts against the top end of the bypass filter media.

16. The cartridge filter of claim 15, wherein the full flow filter media is a substantially annular pleated cellulose media.

17. The filter cartridge of claim 16, wherein the first end of the longitudinal member is attached to the compression member and the second end of the longitudinal member extend through the orifice of the dome end endplate and is connected to the dome end endplate.

18. The filter cartridge of claim 17, wherein the compression member comprises a plurality of radially extending flanges extending from the first end portion to the second end portion of the compression member, the second end portion comprises a plurality of radially outer ends each connected to one of the flanges, the radially outer ends are flexed toward the top end of the plurality of stacked disks.

19. The filter cartridge of claim 17, wherein the second end of the longitudinal member includes a first lug and a second lug, the lugs including ratchets thereon.

20. The filter cartridge of claim 19, further comprising a bypass valve sandwiched between the full flow filter media and the bypass filter media.

21. The filter cartridge of claim 15, wherein the longitudinal member includes a portal opening at the first end that is fluidly connected to the fluid flow passageway of the longitudinal member to allow fluid that bypasses the bypass filter media to flow into an at least partially open internal volume within the full flow filter media.

22. A combination full flow media and bypass media filter cartridge for filtering fluid in an internal combustion engine, comprising:
 a venturi filter having a substantially annular pleated media attached to and extending between a head end endplate and a dome end endplate, the dome end endplate including an orifice;
 a stack of disks extending between a compression end and a venturi end, the stack of disks having an internal columnar flow path defined by a plurality of centrally positioned openings wherein each disk includes at least one opening, the flow path extending between the compression end and the venturi end, the venturi end of the stack of disks being substantially adjacent the dome end endplate of the venturi filter; and
 a bypass valve sandwiched between the venturi end of the stack of disks and the dome end endplate of the venturi filter, the bypass valve being configured to allow flow to bypass the venturi filter and the stack of disks.

* * * * *